(12) United States Patent
Cornell, Jr. et al.

(10) Patent No.: US 6,408,558 B1
(45) Date of Patent: Jun. 25, 2002

(54) APPARATUS AND METHOD FOR IMPARTING A TRAVERSING MOTION TO A TURKEY DECOY

(75) Inventors: Richard J. Cornell, Jr., 114 Woodside Dr., Honea Path, SC (US) 29654; David T. Hamby, Anderson, SC (US)

(73) Assignee: Richard J. Cornell, Jr., Honea Path, SC (US)

( * ) Notice: Subject to any disclaimer, the term of this patent is extended or adjusted under 35 U.S.C. 154(b) by 0 days.

(21) Appl. No.: 09/706,892

(22) Filed: Nov. 6, 2000

(51) Int. Cl.[7] .............................................. A01M 31/06
(52) U.S. Cl. ..................................................... 43/2; 43/3
(58) Field of Search ...................... 43/2, 3, 1; 446/228, 446/229

(56) References Cited

U.S. PATENT DOCUMENTS

| | | | | |
|---|---|---|---|---|
| 4,965,953 A | * | 10/1990 | McKinney | 43/2 |
| 5,168,649 A | * | 12/1992 | Wright | 43/2 |
| 6,138,396 A | * | 10/2000 | Capps | 43/3 |
| 6,212,816 B1 | * | 4/2001 | Babbitt et al. | 43/3 |
| 6,311,425 B1 | * | 11/2001 | Capps | 43/3 |

* cited by examiner

Primary Examiner—Peter M. Poon
Assistant Examiner—Bethany L Griles
(74) Attorney, Agent, or Firm—Ralph Bailey

(57) ABSTRACT

Apparatus and method are illustrated for moving a decoy carrier (B) upon a trackway (A) for operating under the control of a hunter through a linear connector (C) against the force of a constant tension spring (D) wherein a motor driven belt (E) is radio-controlled in response to operation by the hunter. A camming device (F) reverses the direction the turkey decoy faces at the end of each traversing motion.

17 Claims, 5 Drawing Sheets

APPARATUS AND METHOD FOR IMPARTING A TRAVERSING MOTION TO A TURKEY DECOY

BACKGROUND OF THE INVENTION

This invention relates to an animated turkey decoy and method wherein a turkey decoy is traversed back and forth along a linear path under the control of a hunter. The prior art is best illustrated by U.S. Pat. Nos. 5,168,649, 5,233,780, and 6,092,322.

Movements of turkey decoys of the prior art are initiated by the hunter causing movements of the turkey body parts. Prior art decoys may include mechanically produced calls also under the control of the hunter. While the articulated turkey decoys of the prior art are often effective in attracting birds, during the latter part of the season especially, turkeys become accustomed to such body movements with the decoy in a single position and to calling.

Hunters have long known that during the feeding process wild turkeys often move in a traversing motion back and forth stopping intermittently to feed or to look and listen thereby guarding against human intruders or other enemies. If this traversing motion could be imitated it is thought that even the most wary birds may be drawn within range of the hunter.

SUMMARY OF THE INVENTION

Accordingly, it is an important object of the invention to provide an inexpensive, easily operated apparatus for providing a traversing motion to a turkey decoy under the control of the hunter.

Another important object of the invention is to provide a traversing apparatus for a turkey decoy which utilizes a single track and yet permits the turkey decoy to be turned always facing the direction of motion at the conclusion of each traverse.

Another important object of the invention is to provide a radio-controlled motor apparatus including apparatus for initiating and providing power for effecting the traversing motion under the control of the hunter.

It has been found that use of a constant tension spring, of the type usually provided for extensible metallic tape measures, provides an effective expedient for providing control of the power for a traversing action. A trackway may be placed upon the ground for serving as a guide for the carrier upon which the decoy is mounted. The decoy carrier has traversing motion imparted through it by a linear connector pulled by the hunter against the force of the constant tension spring. Upon completion of a traversing motion the turkey decoy is moved by the operation of the spring in an opposite direction upon reliance of the linear connector. In order to face in the opposite direction a camming action changes the direction in which the decoy is facing preparatory to an encasing traverse. Alternately a radio-controlled apparatus may be provided for actuating an electric motor for moving the decoy. In this example a belt is illustrated as being of circular cross-section and mounted between drums.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a method and apparatus for imparting a traversing motion to a turkey decoy. An elongated trackway A is positionable on the ground remote from a hunter. A decoy carrier B is slidably mounted on the trackway for movement in a path traversing the trackway. A linear actuator including a linear connector C and a spring D connected to the decoy to the trackway is operatable by a hunter for moving the decoy carrier along the trackway. Thus, the decoy carrier is moved in one direction on the trackway and returned in an opposite direction on the trackway. Alternatively the linear actuator may be configured as a motor driven belt E which may be radio-controlled. A camming apparatus F including a post and an arm carried by a decoy holder on the carrier is preferably provided to turn the decoy in the direction of the traversing motion at the end of each traverse of the trackway.

Figure 1:
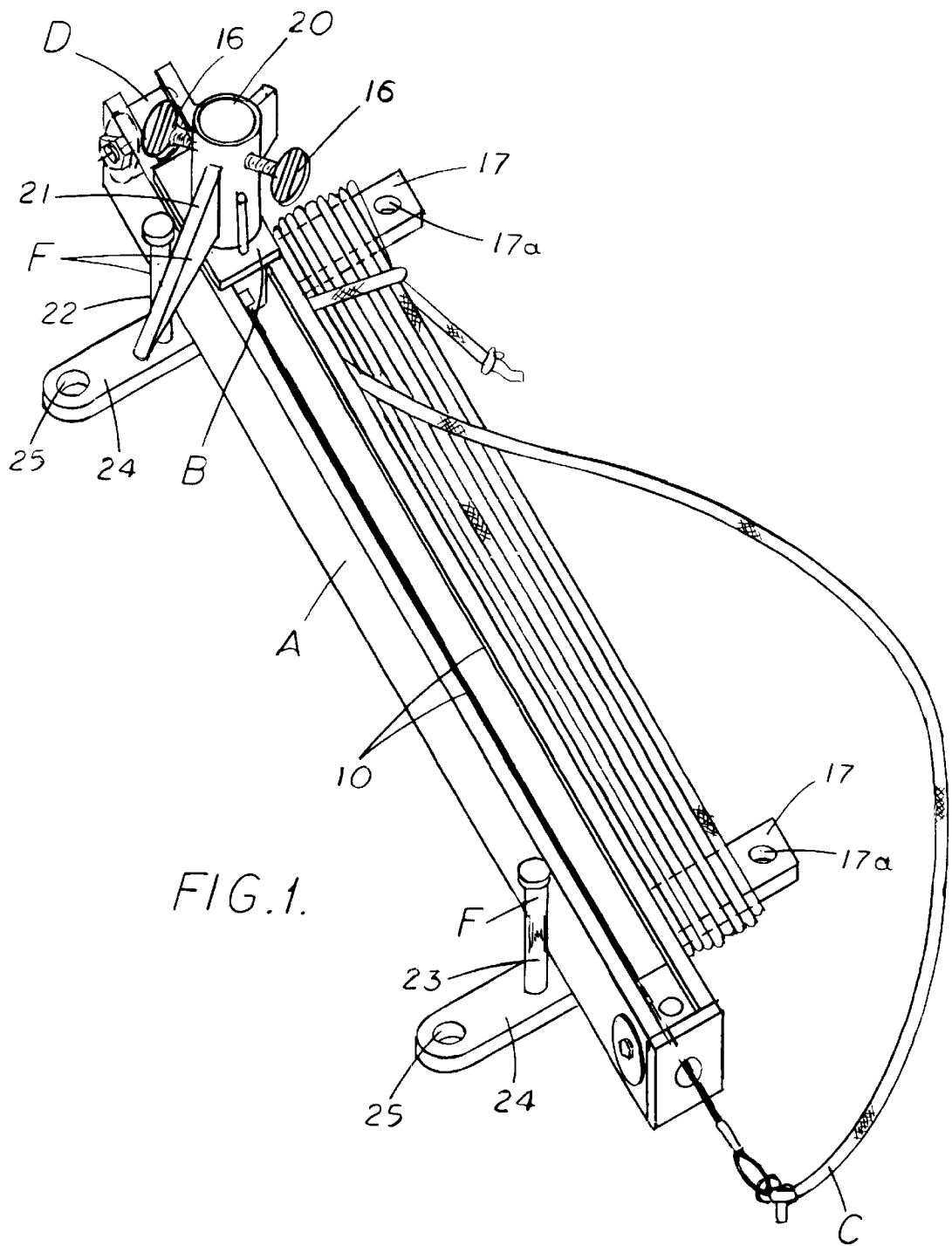
FIG. 1 is a left front perspective view illustrating a trackway positionable upon the ground in carrying a decoy for sliding motion thereon responsive to a pulling action by the hunter against the force of a spring with camming apparatus for turning the turkey decoy 180° at the conclusion of each traverse.
Figure 2:
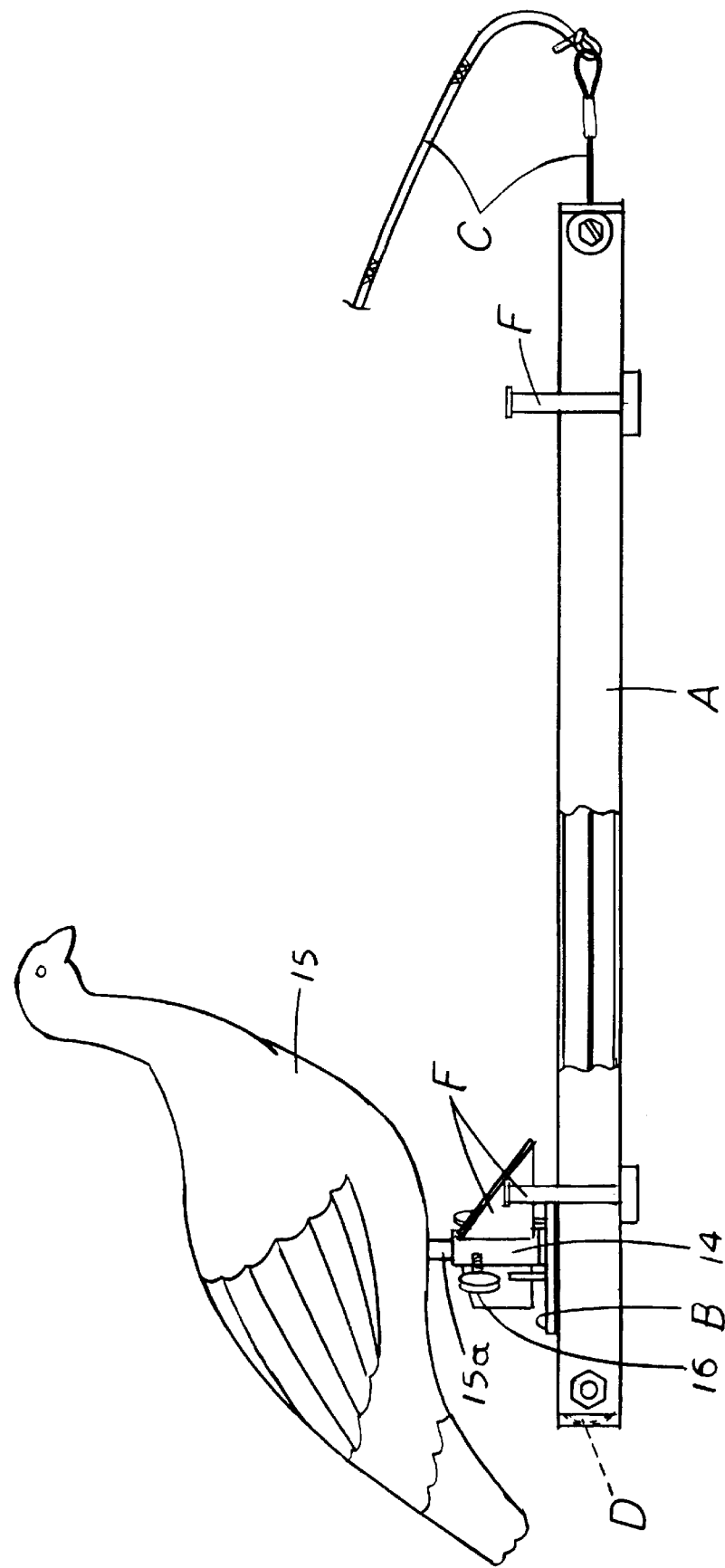
FIG. 2 is a side elevation illustrating the track in position as upon the ground remote from the hunter with parts broken away to illustrate the linear connector for operation by the hunter to move carrier on which the decoy is mounted for sliding movement on the trackway.
Figure 3:
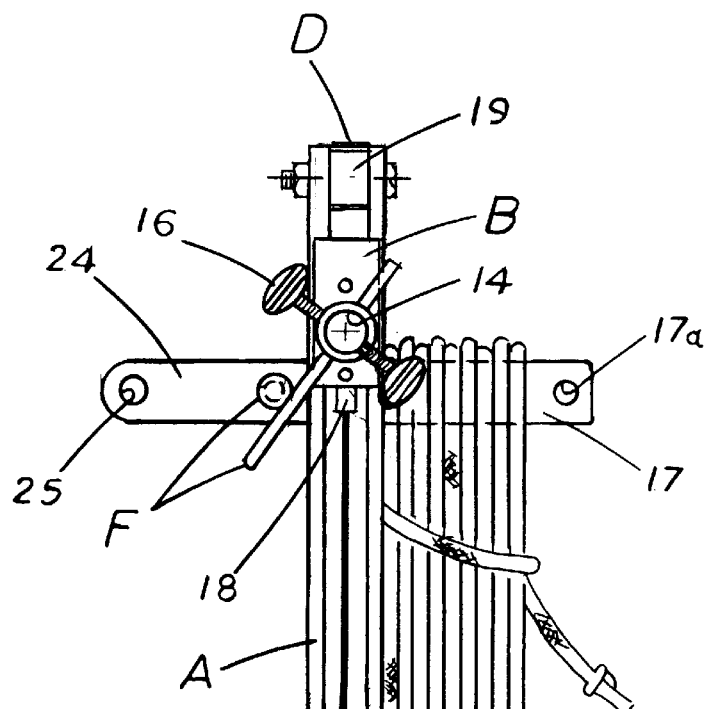
FIG. 3 is a top plan view of the apparatus when the linear connecting member is wound for storage preparatory to moving and redeploying the apparatus for facilitating the imparting of a traversing motion to the turkey decoy when the decoy is turned upon the decoy carrier following each traverse of the trackway.
Figure 3:
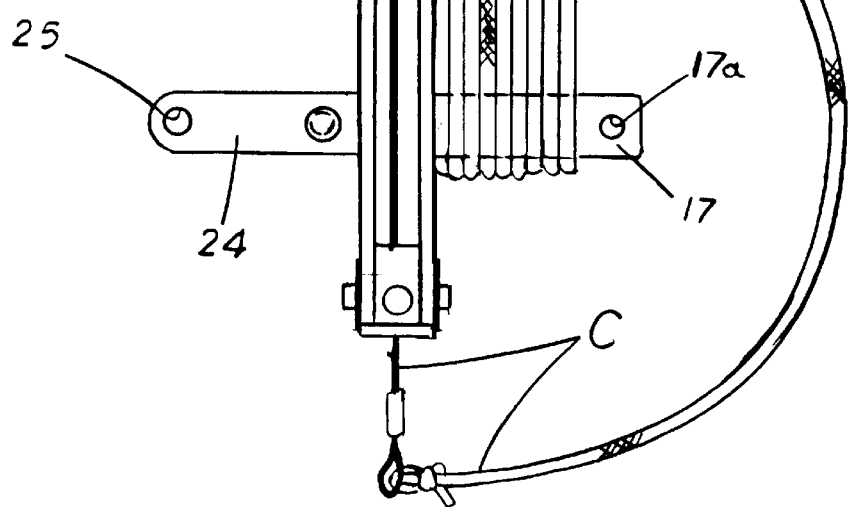

The elongated trackway is best illustrated in FIGS. 1–5 wherein the trackway includes spaced upright horizontal rails 10 which serve as guides for slidably positioning the decoy carrier B therebetween. The decoy carrier B is illustrated as including a depending frame 11 bridged by an upper horizontal member 12 and fastened thereto by a screw 13. The horizontal upper member 12 carries an upright receptacle 14 for receiving a base member 15a for supporting the body 15 of the turkey decoy. A thumb screw 16 is provided for fastening the base of the turkey decoy 15a within the upright receptacle 14. The pedestal or base 15a supports the turkey decoy body 15 within the upright receptacle 14, FIG. 2. It will be noted that laterally extending ears 17 having openings 17a provide receive spikes for securing the trackway A when it is placed upon the ground remote from the hunter. The ears 17 also act as posts for winding up the linear connector C as illustrated in FIGS. 1 and 3 as a rope. The spring D is a constant tension extensible flat steel member 18 carried by a housing 19 mounted on an end of the trackway.

Figure 4:
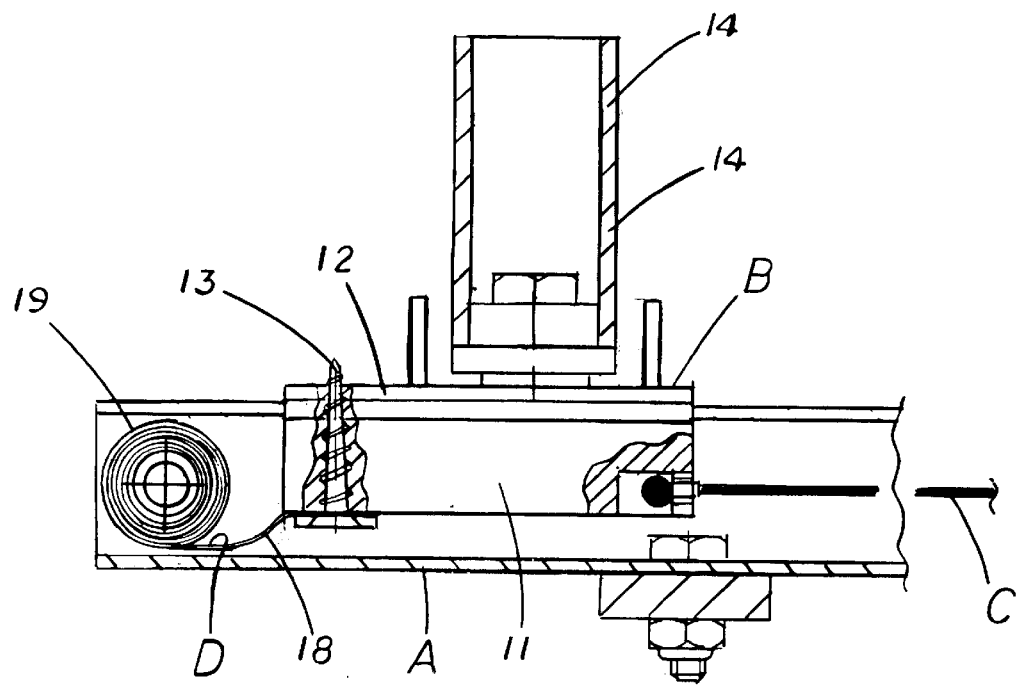
FIG. 4 is an enlarged side elevation with parts broken away illustrating the decoy carrier b upon the trackway with the linear actuator including a connecting member and coiled constant tension spring.
Figure 5:
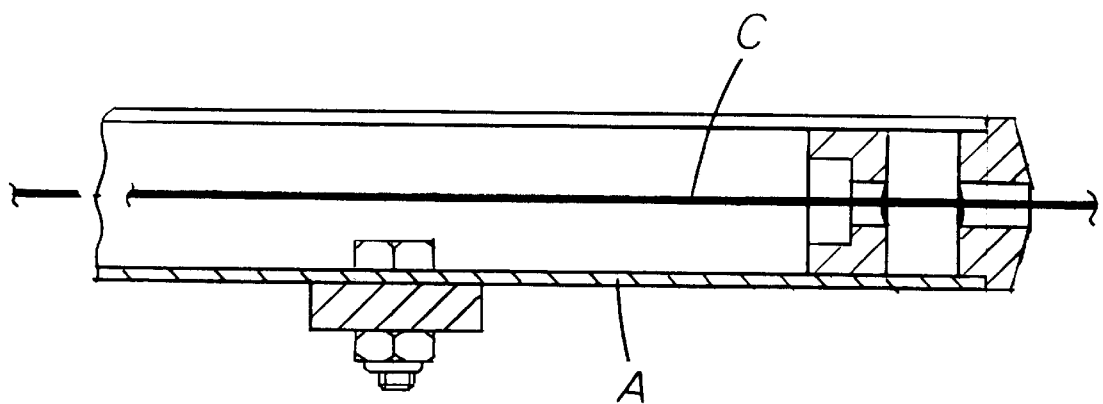
FIG. 5 is a side elevation, with parts in section, illustrating the front end of the trackway accommodating the linear connector for movement responsive to the action by the hunter.

The decoy carrier B carries on its upper plate the upright open receptacle 20 as best seen in FIGS. 1, 3, and 4. An outwardly extending camming member 21 is carried in upright position by the upright open receptacle 20. The camming member 21 first engages a post 22 at a rear end of the trackway on the end of a first traverse and a second post 23 carried at the forward end of the trackway at the end of the next traverse. A camming action is provided by the arm 21 and posts 22 and 23 at each end of the track for reversing the direction in which the decoy is facing the ears projecting outwardly as at 24 are carried opposite the ears 17 on the other side of the trackway. These ears provide holes 25 through which spikes or pins (not shown) may be provided for further securement of the trackway upon the ground.

Figure 6:
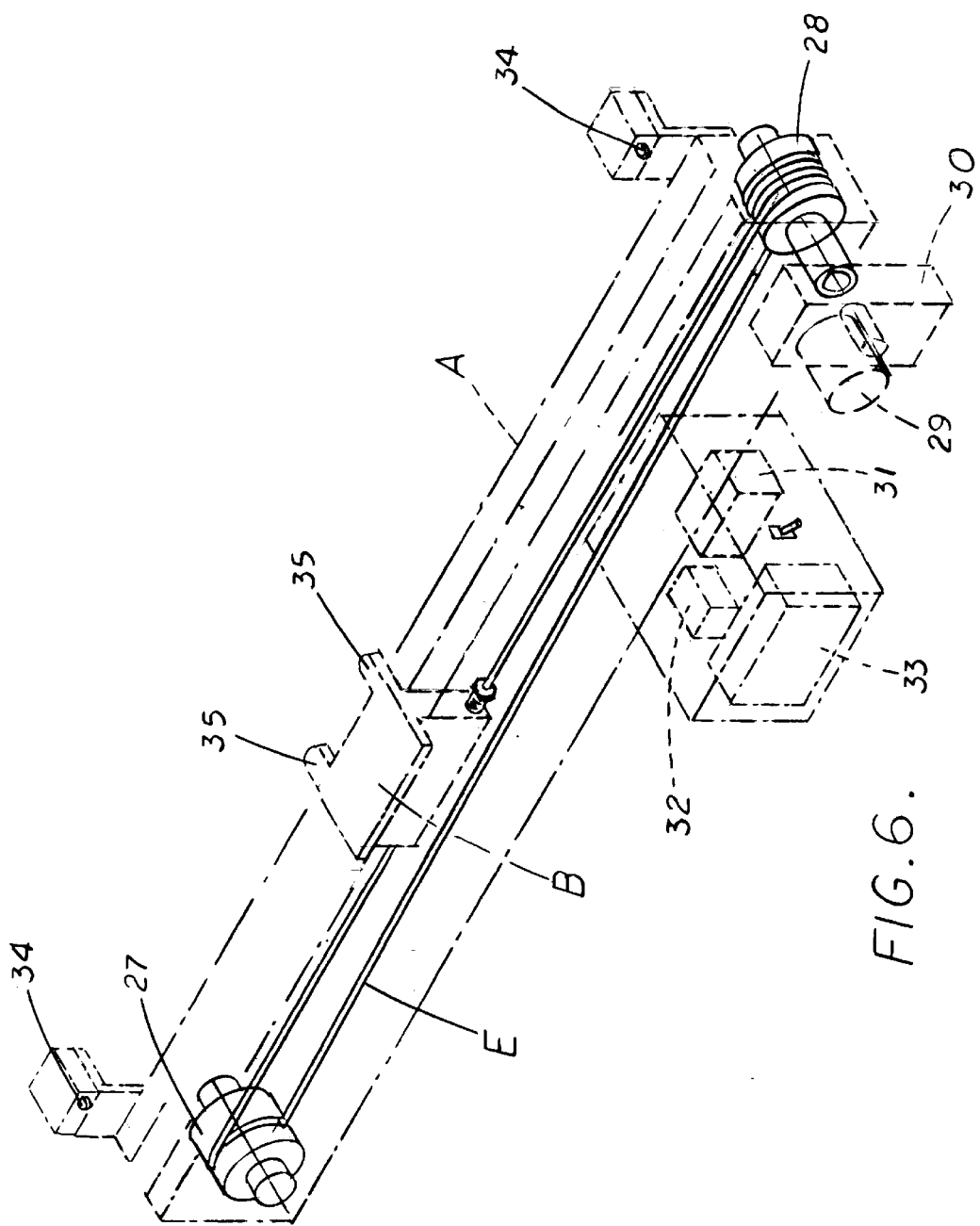
FIG. 6 is a left perspective view illustrating a modified form of the invention wherein a linear actuator is configured to include a motor driven belt which may be radio operated by a hunter to bring about an intermittent and natural traversing movement for attracting wild turkeys.

FIG. 6 illustrates a modified form of the invention wherein the linear actuator is configured to include a motor driven belt E shown as being of a circular cross-section. The belt E is carried upon rotating drums 27 and 28. The drum 28 at the front end of the apparatus is driven by an electric motor 29 through a gear box 30 from a change over relay 31 responsive to a signal from a receiver 32 provided for receiving a radio signal from a transmitter (not shown) operated by the hunter. A suitable battery pack is schematically illustrated as at 33. A switch 34 is carried by suitable brackets mounted at each end of the trackway for engagement by the respective projections 35 extending outwardly from the decoy carrier. Any other suitable drive apparatus may be utilized, for example, including a reversing motor with screw shaft (not shown).

While a preferred embodiment of the invention has been described using specific terms, such description is for illustrative purposes only, and it is to be understood that changes and variations may be made without departing from the spirit or scope of the following claims.

What is claimed is:

1. Apparatus for imparting a traversing motion to a turkey decoy comprising:
   an elongated trackway positionable on the ground;
   a decoy carrier slidably mounted on the trackway for movement in a path traversing the trackway;
   a spring connected to the decoy carrier and to the trackway; and
   a linear connector positionable between a hunter and the decoy carrier for manually pulling the decoy carrier along the trackway against the force of the spring thereby developing tension in the spring;
   whereby the decoy carrier is pulled in one direction on the trackway and returned in an opposite direction by the tension developed in the spring.

2. The apparatus set forth in claim 1 including mechanism for changing the direction in which the turkey is facing at the end of each traverse.

3. The apparatus set forth in claim 2 including a camming device at each end of a single track for rotating the turkey through an angle of 180°.

4. The apparatus set forth in claim 3 wherein the camming device includes an outwardly projecting arm carried by a rotatable receptacle for receiving a base of a decoy and a post carried by the trackway engagable by the arm.

5. The apparatus set forth in claim 1 wherein the spring is a flat extensible constant tension spring mounted at an end of the trackway.

6. Apparatus for imparting a traversing motion to a turkey decoy comprising:
   an elongated trackway positionable on the ground remote from a hunter;
   a decoy carrier mounted on the trackway for movement in a path traversing the trackway; and
   a linear actuator operable by a hunter for moving the decoy carrier along the trackway;
   whereby the decoy carrier is moved in one direction on the trackway and returned in an opposite direction on the trackway.

7. The apparatus set forth in claim 6 wherein the linear actuator includes a constant tension spring at an end of the trackway and a linear connector through which a hunter may pull to initiate a traverse of the decoy against the force of the spring.

8. The apparatus set forth in claim 6 wherein the linear actuator includes a radio-operated motor for initiating a traverse.

9. The apparatus set forth in claim 6 including a camming device at each end of the trackway for rotating the decoy through an angle of 180° at each end of the trackway.

10. A method for imparting a traversing motion to a turkey decoy comprising the steps of:
    positioning an elongated trackway on the ground remote from a hunter;
    carrying a decoy on the trackway for movement in a traversing path; and
    remotely initiating operation of a linear actuator by the hunter for moving the decoy along the trackway;
    whereby the decoy carrier is moved in one direction on the trackway and returned by the other direction on the trackway.

11. The method set forth in claim 10 wherein a single trackway is positioned on the ground.

12. The method set forth in claim 11 wherein the decoy is rotated through an angle of 180° at each end of the trackway.

13. The method set forth in claim 10 including the step of pulling the decoy along the trackway against the force of a constant tension spring.

14. The method set forth in claim 13 including the step of positioning a camming device at each end of the trackway for rotating the decoy through an angle of 180° at each end of the trackway.

15. The method set forth in claim 13 including the step of pulling the decoy through a linear connector and winding the linear connector on the trackway for storage after hunting.

16. The method of claim 10 including the step of operating a radio for actuating a motor for moving the decoy on a traversing motion.

17. The method set forth in claim 16 including the step of driving a drum mounted belt for moving the decoy on the trackway.

* * * * *